United States Patent
Agarwal

(10) Patent No.: US 6,214,910 B1
(45) Date of Patent: Apr. 10, 2001

(54) FLEXIBLE THERMOPLASTIC POLYESTER COMPOSITIONS

(75) Inventor: Surendra Hukamchand Agarwal, Evansville, IN (US)

(73) Assignee: General Electric Company, Schenectady, NY (US)

( * ) Notice: Subject to any disclaimer, the term of this patent is extended or adjusted under 35 U.S.C. 154(b) by 0 days.

(21) Appl. No.: 07/920,009

(22) Filed: Jul. 27, 1992

Related U.S. Application Data

(63) Continuation of application No. 07/536,947, filed on Jun. 11, 1990, now abandoned, which is a continuation of application No. 07/333,741, filed on Apr. 3, 1989, now abandoned, which is a continuation of application No. 07/098,734, filed on Sep. 16, 1987, now abandoned, which is a continuation of application No. 06/935,587, filed on Nov. 26, 1986, now abandoned, which is a continuation of application No. 06/532,279, filed on Sep. 14, 1983, now abandoned.

(51) Int. Cl.$^7$ .................................................. C08L 51/04
(52) U.S. Cl. .................. 524/143; 524/141; 524/504; 523/201; 525/67
(58) Field of Search .............................. 525/67; 524/141, 524/143, 504; 523/201

(56) References Cited

U.S. PATENT DOCUMENTS

| | | | |
|---|---|---|---|
| 3,864,428 | * 2/1975 | Nakamura | 525/67 |
| 4,066,600 | * 1/1978 | Pletcher | 524/143 |
| 4,180,494 | * 12/1979 | Fromuth | 525/63 |

* cited by examiner

Primary Examiner—Patricia A. Short

(57) ABSTRACT

New and improved flexible thermoplastic polyester compositions are disclosed having a flexural modulus of not substantially greater than about 140,000 psi, which are useful for forming flexible shaped articles such as hoses, tubings, wire coatings, cable jacketing and the like. The compositions comprise (a) a substantially crystalline thermoplastic linear polyester resin composition and (b) an amount of an amorphous copolymer resin effective to reduce the flexural modulus of (a) to not substantially greater than about 140,000 psi. In an alternate embodiment ultra-low modulus thermoplastic polyester compositions are provided which additionally comprise (c) a minor effective amount of an enhancing agent capable of further reducing the flexural modulus of (a) plus (b) to not substantially greater than about 70,000 psi. It is disclosed that fillers, reinforcements and flame retardant agents may be incorporated into the ultra-low modulus compositions to provide filled, reinforced or flame retardant flexible thermoplastic polyester compositions having flexural moduli which are still not substantially greater than about 140,000 psi.

12 Claims, No Drawings

FLEXIBLE THERMOPLASTIC POLYESTER COMPOSITIONS

This is a continuation of application Ser. No. 07/536,947 filed on Jun. 11, 1990, now abandoned, which is a continuation of application Ser. No. 07/333,741, filed Apr. 3, 1989 (abandoned), which is a continuation of application Ser. No. 07/098,734, filed Sep. 16, 1987 (abandoned), which is a continuation of application Ser. No. 06/935,587, filed Nov. 26, 1986 (abandoned), which is a continuation of application Ser. No. 06/532,279 filed Sep. 14, 1983, now abandoned.

The present invention relates to flexible thermoplastic polyester compositions. More particularly, it relates to thermoplastic extrusion and molding compositions having a flexural modulus of less than 140,000 psi, which are capable of being formed into flexible hoses, tubings, wire coatings, cable jackets, and in film or sheet form, for use as automobile bumper and seat covers and the like.

High molecular weight linear polyesters and copolyesters of glycols and terephthalic or isophthalic acid have been available for a number of years. These are described, inter alia, in Whinfield, et al, U.S. Pat. No. 2,465,319 and in Pengilly, U.S. Pat. No. 3,047,539, incorporated herein by reference. These patents disclose that the polyesters are particularly advantageous as film and fiber formers.

With the development of molecular weight control, the use of nucleating agents and two-step molding cycles, poly(ethylene terephthalate) has become an important constituent of injector moldable compositions. Poly(1,4-butylene terephthalate), because of its very rapid crystallization from the melt, is uniquely useful as a component in molding resins. Work-pieces molded from such polyester resins, alone or combined with reinforcement, in comparison with other thermoplastics, offer a high degree of surface hardness and abrasion resistance, high gloss, and lower surface friction.

Stable polyblends of poly(1,4-butylene terephthalate) and poly(ethylene terephthalate) can be molded into useful unreinforced and reinforced articles. See Fox and Wambach, U.S. Pat. No. 3,953,394, incorporated herein by reference.

In U.S. Pat. No. 3,218,372 to Okamura et al, it is disclosed that aromatic polycarbonate resins may be blended with poly)alkylene terephthalate) resins over a wide range of proportions to form useful molding compositions having an improved combination of properties over either the polycarbonate or the polyester resins alone.

In general, the above-described compositions based on the poly)alkylene terephthalate) resins have a useful balance of physical properties, as reported in the *Modern Plastics Encyclopedia* 1982–1983. The compositions exhibit good electrical properties, e.g., the dielectric strength of poly(1,4-butylene terephthalate) ranges from about 420–550 volts/mil. The compositions exhibit good solvent resistance to such solvents as leaded and unleaded gasoline. The poly(alkylene terephthalates) possess only moderate impact resistance, e.g., the notched Izod impact strength of poly(1,4-butylene terephthalate) (PBT) is within the 0.8–1.0 ft-lbs./in. range and for poly(ethylene terephthalate) (PET) within the 0.25–0.65 ft-lbs/in. range. Aromatic polycarbonates exhibit relatively high impact resistance having notched Izod impact strengths in the 10.0–16.0 ft-lbs/in. range, and blending aromatic polycarbonates with poly)alkylene terephthalates) is known to effectively increase the impact strength of the latter.

Poly(alkylene terephthalate) homopolymers, resin blends based on mixtures of these polyesters, and mixtures of poly(alkylene terephthalates) with aromatic polycarbonates, are also known to exhibit relatively high stiffness, e.g., each is characterized by a high flexural modulus of above about 300,000 psi. More particularly, the flexural modulus of PBT at room temperature is about 330,000–350,000 psi; of PET about 340,000–360,000 psi and of aromatic polycarbonate above about 340,000 psi. Compositions exhibiting this high a flexural modulus are too stiff to be considered flexible; and as such, are generally unsuitable for forming articles which are required to have a high degree of flexibility, such as hoses, tubings, cable jacketing and the like.

On the other hand, thermoplastic compositions having a flexural modulus of less than about 140,000 psi, preferably less than about 120,000 psi and especially preferably less than about 100,000 psi, exhibit sufficient flexibility for use in forming flexible tubings, cable jacketing, or flexible fibers or sheets, for use in automobile bumper covers and the like.

In the past, efforts have been made to render polyesters and polyester resin compositions more flexible. More particularly, in one method, certain plasticizer compounds are added to the polyester resin composition to effectively decrease the glass transition temperature of the composition. The glass transition temperature of a polymer resin or resin composition is that temperature below which the resin or composition is in a glass-like brittle state. Above the glass transition temperature, the resin or composition exhibits greater resilience, flexibility and impact strength.

Plasticizers are generally high boiling organic liquids or low melting solids that exert varying degrees of solvating action on resins. A plasticizer's softening action usually is attributed to its ability to reduce the intermolecular attractive forces between the polymer molecules in a resin or resin system. More particularly, plasticizers are believed to work in two different ways. The first involves reaction between the plasticizer and certain reactive groups on the polymer molecule which is operative to reduce attractive forces between the resin molecules by reducing or nullifying dipole—dipole interactions, hydrogen bonding or other forces between molecules of the resin composition. In this manner, for example, the dipoles of the polymer molecules are no longer available to attract adjacent polymer molecules.

In accordance with another theory, plasticizers are believed to impart a softening effect on polymer compositions by a simple dilution effect. In this instance, attractive forces between polymer molecules are reduced by increased separation.

Generally, the plasticizer compounds which are employed with polyester resin compositions include low and medium molecular weight esters representing the reaction products of acids or acid anhydrides and alcohols. The acids may be cyclic, such as ortho-, iso- or terephthalic, benzoic, trimellitic and the like, or they may be linear, e.g., adipic, azelaic, sebacic, phosphoric and the like. The alcohol constituent may be monohydric, such as 2-ethylhexanol, isodecanol, butanol, isononyl, mixed alkyl, etc., or polyhydric, for example, ethylene glycol, propylene glycol, pentaerythritol, and the like. Other suitable plasticizers have included toluene sulfonamides. and N-alkyl-substituted toluene sulfonamides. Although these plasticizer compounds have been effective at reducing random brittleness in poly)alkylene terephthalate) resin compositions, in order to obtain a polyester compositon having a flexural modulus of less than about 140,000 psi such large quantitites of the plasticizer must be added, that other beneficial properties of the polyester are lost. Moreover, toxicity problems and volatility problems associated with these plasticizers have rendered their use less desirable for most end use applications. More particularly, known plasticizer compounds have a tendency to migrate to the surface of the polymer composition and thereafter volatilize from the surface, liberating potentially toxic gases, which may be harmful if the gases are emitted into the interior of an automobile, for example, and elsewhere. Furthermore, the migration and volatility of most known plasticizers leads to a decrease in flexibility with respect to time, such that the flexible service lives of polyester compositions containing these plasticizers is generally, undesirably short.

In copending application Ser. No. 290,879, filed Aug. 7, 1981, which is a continuation of U.S. Pat. No. 762,325 filed Dec. 20, 1976 certain block copolyesters are described which are formed from polyesters and polyester diols. More particularly, the block copolyesters are derived from terminally-reactive pre-formed blocks of poly(1,4-butylene terephthalate) and from terminally reactive pre-formed blocks of an aromatic/aliphatic or aliphatic polyester. The blocks in the copolyester are connected end-to-end by ester linkages. Examples of these block copolyesters include poly(1,4-butylene terephthalate)-co-poly(hexyleneazelate-co-isophthalate)) and poly((1,4-butylene terepthalate)-co-poly(neopentyladipate)). These block copolyester materials are described as having flexural moduli of between 30,000 psi to about 300,000 psi. The block copolyesters are useful per se as molding resins and also in intimate combination with poly(alkylene terephthalate) homopolymer resins.

Although copolymerization, and especially block copolymerization, does lead to the formation of low modulus polyester products, the use of these copolyester materials to form flexible polyester compositions has been discouraged by the practical difficulties involved in manufacturing the copolyesters and by the increasingly high costs of the polyester diol reactants to be incorporated into the poly(alkylene terephthalate) chains. As a result, other low modulus, flexible polyester materials are still needed and desired.

It should be noted that elsewhere in the polyester arts, it has been proposed to incorporate a variety of additives and modifiers to poly(alkylene terephthalate) resin compositions to improve various physical properties of the compositions. For example, reinforcements comprising glass fibers alone, or in combination with mineral fillers, such as talc, mica and clay, have been added to improve impact strength and to improve electrical properties. Thus, for example in U.S. Pat. No. 4,296,021 to Wambach, it is disclosed that the addition of aluminum silicate alone, or in combination with glass fibers, provides a high molecular weight linear polyester resin with improved impact strength and with improved long-term, high voltage dielectric therein, that the addition of glass fiber reinforcement and/or mineral fillers increases the flexural modulus of the composition. For example, as described therein the flexural modulus of a thermoplastic composition comprising 70% by weight PBT and 30% by weight of glass fibers is 1,000,000 psi, for compositions comprising 70% by weight PBT and 30% by weight aluminum silicate, the flexural modulus is about 637,000 psi; and for compositions comprising 65% by weight PBT, 15% by weight aluminum silicate and 20% by weight glass fibers, the flexural modulus is in the range of about 859,000 to 950,000 psi. Therefore, as shown in said patent and elsewhere, e.g., *Modern Plastics Encyclopedia* 1982–1983, pages 480–481, an improvement in electrical properties is achieved by the addition of fillers and reinforcements, but only with a concurrent and significant sacrifice in flexibility.

Elsewhere in the polyester art, it has been proposed to increase the impact strength of polyesters by adding other polymer resins. For example, Baron et al, in U.S. Pat. No. 4,044,073 disclose that a useful impact modifier for such polyesters is an aromatic polycarbonate. Brinkmann et al in U.S. Pat. No. 3,591,659 disclose that a useful family of modifiers comprises polyalkylacrylates, methacrylates and/or ethacrylates. Schlichting et al, in U.S. Pat. No. 4,022,748disclose that a rubber-elastic graft copolymer having a glass transition temperature below −20° C. is a useful modifier.

Nakamura et al, U.S. Pat. No. 3,864,428, disclose that compositions comprising a major proportion of an aromatic polyester, a minor proportion of an aromatic polycarbonate, and from 1 to 30% by weight of a simple grafted methyl methacrylate-butadiene-styrene copolymer possess improved impact strength and chemical resistance over the polycarbonate resin alone.

More recently, it has been discovered that the addition of certain grafted core-shell copolymer resins to polyester resin compositions provides articles molded therefrom with superior impact resistance over a broad range of temperatures. One type of core-shell graft copolymer modifier having a butadiene-based core and methacrylate shell is described in copending U.S. Ser. No. 316,946, filed Oct. 30, 1981 and in U.S. Pat. No. 4,180,494 to Fromuth et al. These core-shell copolymers comprise a rubbery first stage polymerized from a monomer system comprising 50 percent by weight of butadiene, alone or in combination with a vinyl comonomer, e.g. styrene, and a rigid thermoplastic final stage polymerized from methyl methacrylate and a crosslinking monomer. As is described in the above-identified application, when a modifier combination comprising an aromatic polycarbonate resin and this butadiene-based-core-shell copolymer resin is added to a polyester composition comprising a poly(1,4-butylene terephthalate) resin, shaped articles molded therefrom possess good impact strength. The application also discloses that, although methyl methacrylate-butadiene-styrene copolymers not of the core-shell type also provide good impact strength at room temperatures of about 23° C., only the compositions made with the core-shell copolymers retain more than 70% of their impact strength at −40° C., making them uniquely suitable for molding such articles as automobile bumpers, ski bindings and the like, where low-temperature impact resistance is important.

Other useful core-shell copolymer resins are those having a rubbery acrylate core and a hard methacrylate shell such as are described in Farnham et al, U.S. Pat. No. 4,096,202. As disclosed therein, the acrylate-based core shell copolymer resins are comprised of a rubbery first phase polymerized from a monomer system comprising a $C_1$–$C_6$ alkyl acrylate and minor amounts of a crosslinking monomer and a graft-linking monomer, respectively, and a rigid thermoplastic final phase polymerized from a monomer system comprising at least 50% by weight of a $C_1$–$C_6$ alkyl methacrylate. These core-shell copolymer resins provide enhanced impact strength to saturated polyester compositions.

In U.S. Pat. No. 4,257,937 to Cohen et al and in U.S. Pat. No. 4,264,487 to Fromuth et al, impact modified thermoplastic compositions are disclosed which comprise a poly (alkylene terephthalate) resin, an aromatic polycarbonate resin and an acrylate-based core-shell copolymer resin.

In general, each of the above-described patents and applications disclose polyester compositions which include the impact modifying additive in amounts of from about 5 to about 40% by weight, based upon the weight of the overall composition. Although these levels of modifiers do provide substantial increases in the impact resistance of the thermoplastic compositions, they do not provide flexible compositions having a flexural modulus of below about 140,000 psi. More particularly, and by way of illustration, (Farnham et al) in U.S. Pat. No. 4,096,202, disclose a composition comprising about 60% by weight of PBT and about 40% by weight of an n-butyl acrylate/methylmethacrylate core-shell multiphase composite interpolymer resin. This composition containing the maximum amount of impact modifier taught by Fromuth et al, has a flexural modulus in excess of 156,000 psi.

Although many of the above-identified patents, applications, and publications describe methods for improving the electrical properties, glass transition temperature and impact resistance of polyester resin compositions, they do not describe or suggest compositions or methods for forming flexible thermoplastic polyester compositions having flexural moduli below about 140,000 psi.

SUMMARY OF THE INVENTION

Unexpectedly, in view of the foregoing, it has now been discovered that new and improved thermoplastic polyester compositions may be provided with a flexural modulus of less than about 140,000 psi, not by the addition of incorporation of toxic volatile plasticizers, nor by copolymerization techniques, but rather, by simple compounding and extrusion methods utilizing existing equipment.

In accordance with the present invention new and improved flexible thermoplastic polyester compositions are provided in the form of compositions comprising:

(a) a substantially crystalline thermoplastic linear polyester resin composition; and (b) an amount of component capable of reducing the flexural modulus of (a) to not substantially greater than about 140,000 psi, said component comprising at least one substantially amorphous copolymer resin.

Generally, and without limitation, the new and improved flexible thermoplastic polyester compositions will comprise from about 15 to about 55 parts by weight of component (a) and from about 35 to about 85 parts by weight of component (b), based upon the total weight of (a) and (b) combined.

The substantially crystalline thermoplastic linear polyester resin composition, component (a), may comprise a poly(alkylene terephthalate) homopolymer resin, or blends of two or more of such resins, or may comprise a blend of one or more of said resins with an aromatic polycarbonate resin.

The substantially amorphous copolymer resins found to be effective of reducing the flexural modulus of (a) to less than about 140,000 psi include:

(i) an acrylate-based core shell multi-phase composite interpolymer resin, alone, or precompounded to form a concentrate composition with a second component selected from poly (alkylene terephthalate) resins; olefin homopolymer or copolymer resins said copolymers being comprised of a $C_1$–$C_{10}$ olefin and a co-monomer selected from acrylic acid, methacrylic acid, or alkyl esters of such acids or triaryl phosphates compositions;

(ii) a butadiene-based core-shell multi-phase composite interpolymer resin, alone or precompounded to form a concentrate substantially as described above;

(iii) a terpolymer of a $C_1$–$C_6$ alkyl acrylate a $C_1$–$C_6$ alkyl methacrylate and a monoalkenyl aromatic monomer; ad well as, (iv) mixtures of one or more of these amorphous copolymers.

The compositions of the present invention may be prepared by conventional methods for example by dry blending followed by extrusion, or by dry blending, extrusion, and injection molding. The compositions exhibit flexural moduli of not substantially greater than about 140,000 psi and are useful for forming flexible shaped articles such as hoses, tubings, wire coatings, cable jacketing, automobile bumper covers and the like.

In accordance with another aspect of the present invention, it has unexpectedly been discovered that the flexible thermoplastic compositions of the present invention may be provided with ultra low flexural moduli on the order of about less than 70,000 psi by incorporating in compositions comprising components (a) and (b), a minor effective amount of an enhancing agent (c) which is capable of further reducing the flexural modulus of (a) and (b). Enhancing agent (c) may generally be added in amounts of from about 5 to about 25 parts by weight based upon the weight of (a), (b) and (c) combined. Suitable for use as enhancing agent (c) are triaryl phosphates, ortho- and para-toluene sulfonamides and N-alkyl-substituted toluene sulfonamides.

In accordance with this aspect of the present invention, it has unexpectedly been discovered that the incorporation of component (c) is effective to reduce the flexural modulus of the overall composition to below about 70,000 psi. It has also been surprisingly discovered that mineral fillers, glass reinforcements and/or flame retardant agents may be added to the ultra low modulus compositions defined by components (a), (b) and (c), and that after such addition, a flexible polyester composition exhibiting a flexural modulus of not substantially greater than 140,000 psi may still be obtained.

Other objects and advantages of the present invention will become apparent from the following detailed description, taken together with the illustrative working examples.

DETAILED DESCRIPTION OF THE INVENTION

In accordance with the present invention, the new and improved flexible thermoplastic polyester compositions first comprise, as component (a), a substantially crystalline thermoplastic linear polyester resin composition.

Component (a) may generally comprise:

(i) a poly(alkylene terephthalate) resin;

(ii) a blend of a poly(1,4-butylene terephthalate) resin and a poly(ethylene terephthalate) resin; or (iii) a blend of (i) with an aromatic polycarbonate resin.

More particularly, the polyesters suitable for use as component (a) herein may be any of the linear or branched saturated polyesters known to those skilled in this art. Generally, the polyesters will comprise substantially crystalline linear saturated polyesters derived from $C_2$–$C_{10}$ alkylene glycols such as ethylene glycol, propylene glycol, 1,4-butanediol etc., including cycloaliphatic glycols, such as 1,4-cyclohexanedimethanol, and mixtures of any of these glycols with one or more aromatic dicarboxylic acids. Preferably, the polyesters will comprise poly($C_1$–$C_6$ alkylene terephthalates) prepared by known techniques, such as the transesterification of esters of terephthalic acid alone or mixtures of esters of terephthalic acid and isophthalic acid, with the glycol or mixture of glycols and subsequent polymerization, by heating the glycols with the free acids or with halide derivatives thereof, and similar processes. These methods are described in U.S. Pat. Nos. 2,465,319 and 3,047,539 incorporated herein by reference and elsewhere.

Preferred poly(alkylene terephthalates) will be substantially crystalline, i.e., having 80% or more of the glycol unit portion being comprised of a single glycol, e.g., 1,4-butanediol, and having at least 80% by weight of the acid unit portion being comprised of a single dicarboxylic acid, e.g., terephthalic acid.

Illustratively, the high molecular weight polyesters will have an intrinsic viscosity of at least about 0.4 deciliters/gram as measured in a 60/40 phenol/tetrachloroethane mixture at 30° C., for poly(ethylene terephthalate) and at least 0.6 and more, preferably 0.8 deciliters/gram, same basis, for poly(1,4-butylene terephthalate). Most preferably, for the former, the intrinsic viscosity will be in the range of 0.5 to 1.0 dl./g. and from 0.9 to 1.2 dl/g. for the latter.

Especially useful when high melt strength is important are branched high melt viscosity poly(1,4-butylene terephthalate) resins, which include a small amount, e.g. up to 5 mole percent based on the terephthalate units, of a branching component containing at least three ester forming groups. The branching component can be one which provides branching in the acid unit portion of the polyester, or in the glycol unit portion, or it can be a hybrid. Illustrative of such branching components are tri- or tetracarboxylic acids, such as trimesic acid, pyromellitic acid, and lower alkyl esters thereof, and the like, or preferably, polyols, and especially preferably, tetrols, such as pentaerythritol, triols, such as trimethylolpropane; or dihydroxy carboxylic acids and hydroxydicarboxylic acids and derivatives, such as tartaric acids, and the like.

The branched poly(1,4-butylene terephthalate) resins and their preparation are described in Borman, U.S. Pat. No. 3,953,404, incorporated herein by reference.

The aromatic polycarbonate resins for use herein to admixture with the polyester resins may be prepared by reacting a dihydric phenol with a carbonate precursor, such as phosgene, a haloformate or a carbonate ester. Generally speaking, such carbonate polymers may be typified as possessing recurring structural units of the formula:

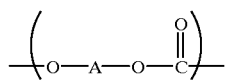

wherein A is a divalent aromatic radical of the dihydric phenol employed in the polymer producing reaction. Preferably, the carbonate polymers used to provide the resinous mixtures of the invention have an intrinsic viscosity (as measured in methylene chloride at 25° C.) ranging from about 0.30 to about 1.00 dl./g. The dihydric phenol which may be employed to provide such aromatic carbonate polymers are mononuclear or polynuclear aromatic compounds, containing as functional groups two hydroxy radicals, each of which is attached directly to a carbon atom of an aromatic nucleus. Typical dihydric phenols are:
2,2-bis-(4-hydroxyphenyl)propane;
hydroquinone;
resorcinol;
2,2-bis-(4-hydroxyphenyl)pentane;
2,4'-(dihydroxydiphenyl)methane;
bis-(2-hydroxyphenyl)methane;
bis-(4-hydroxyphenyl)methane;
bis-(4-hydroxy-5-nitrophenyl)methane;
1,1-bis(4-hydroxyphenyl)ethane;
3,3-bis(4-hydroxyphenyl)pentane;
2,2-dihydroxydiphenyl;
2,6-dihydroxynaphthalene;
bis-(4-hydroxydiphenyl)sulfone;
bis-(3,5-diethyl-4-hydroxyphenyl)sulfone;
2,2-bis-(3,5-dimethyl-4-hydroxyphenyl)propane;
2,4'-dihydroxydiphenyl sulfone;
5'-chloro-2,4'-dihydroxydiphenyl sulfone;
bis-(4-hydroxyphenyl)diphenyl sulfone;
4,4'-dihydroxydiphenyl ether;
4,4'-dihydroxy-3,3'-dichlorodiphenyl ether;
4,4'-dihydroxy-2,5-dihydroxydiphenyl ether;
and the like.

Other dihydric phenols which are also suitable for use in the preparation of the above polycarbonates are disclosed in U.S. Pat. Nos. 2,999,835; 3,038,365; 3,334,154; and 4,131,575.

These aromatic polycarbonates can be manufactured by known processes, such as, for example and as mentioned above, by reacting a dihydric phenol with a carbonate precursor, such as phosgene, in accordance with methods set forth in the above-cited literature and in U.S. Pat. No. 4,123,436, or by transesterification processes such as are disclosed in U.S. Pat. No. 3,153,008, as well as other processes known to those skilled in the art.

It is possible to employ two or more different dihydric phenols or a copolymer of a dihydric phenol with a glycol or with a hydroxy- or acid-terminated polyester or with a dibasic acid in the event a carbonate copolymer or interpolymer rather than a homopolymer is desired for use in the preparation of the polycarbonate mixtures of the invention. Branched polycarbonates are also useful, such as are described in U.S. Pat. No. 4,001,184. Also there can be utilized blends of linear polycarbonate and a branched polycarbonate. Moreover, blends of any of the above materials may be employed in the practice of this invention to provide the aromatic polycarbonate. In any event, the preferred aromatic carbonate polymer for use as component (b) herein is a homopolymer e.g., hompolymer derived from 2,2-bis(4-hydroxyphenyl)propane (bisphenol-A), commercially available under the trade designation LEXAN® from General Electric Company. Generally, in component (a) (iii) the relative proportions of poly(alkylene terephthalate) to aromatic polycarbonate present in the blends may range from 90:10 to 75:25, respectively. The amount of aromatic polycarbonate present in the crystalline polyester resin composition may vary, however higher amounts of polycarbonate tend to undesirably decrease the flexibility of the overall composition.

In accordance with the present invention, the flexible polyester compositions will also include as component (b) an amount of at least one amorphous copolymer resin capable of reducing the flexural modulus of the polyester component (a) to not substantially greater than about 140,000 psi.

A suitable amorphous copolymer for use herein as component (b) is (i) an acrylate-based core-shell multi-phase composite interpolymer resin. More particularly, the acrylate-based core-shell multi-phase composite interpolymer resin is a core-shell interpolymer comprising about 25 to 95 percent by weight of a first elastomeric phase and about 75 to 5 percent by weight of a final rigid thermoplastic shell phase. One or more intermediate phases are optional, for example, a middle stage polymerized from about 75 to 100 percent by weight styrene.

The first stage or core of multiphase composite interpolymer component (b) (i) is polymerized from about 75 to 99.8 weight percent $C_1$ to $C_6$ alkyl acrylate resulting in an acrylic rubber core having a $T_g$ below about 10° C. and crosslinked with 0.1 to 5 weight percent crosslinking monomer and further containing 0.1 to 5 percent by weight graftlinking monomer. The preferred alkyl acrylate is butyl acrylate. The crosslinking monomer is a polyethylenically unsaturated monomer having a plurality of addition polymerizable reactive groups all of which polymerize at substantially the same rate of reaction. Suitable crosslinking monomers include polyacrylic and poly methacrylic esters of polyols such as butylene diacrylate and dimethacrylate, trimethylol propane trimethacrylate, and the like, di- and trivinyl benzene, vinyl acrylate and methacrylate, and the like. The preferred crosslinking monomer is butylene diacrylate.

The graftlinking monomer is a polyethylenically unsaturated monomer having a plurality of addition polymerizable reactive groups, at least one of which polymerizes at substantially different rate of polymerization from at least one other of said reactive groups. The function of the graftlinking monomer is to provide a residual level of unsaturation in the elastomeric phase, particularly in the latter stages of polymerization, and consequently, at or near the surface of the elastomer particles. When the rigid thermoplastic shell phase is subsequently polymerized at the surface of the elastomer, the residual unsaturated, addition-polymerizable reactive groups contributed by the graftlinking monomer participates in the subsequent reaction so that at least a portion of the rigid shell phase is chemically attached to the surface of the elastomer.

Among the effective graftlinking monomers are allyl group-containing monomers of allyl esters of ethylenically unsaturated acids, such as allyl acrylate, allyl methacrylate, diallyl maleate, diallyl fumarate, diallyl itaconate, allyl acid maleate, allyl acid fumarate, and allyl acid itaconate. Somewhat less preferred are the diallyl esters of polycarboxylic acids which do not contain polymerizable unsaturation. The preferred graftlinking monomers are allyl methacrylate and diallyl maleate. A most preferred interpolymer has only two stages, the first stage comprising about 60 to 95 percent by weight of the interpolymer and being polymerized from a monomer system comprising 95 to 99.8 weight butylene diacrylate as crosslinking agent, 0.1 to 2.5 percent by weight allyl methacrylate or diallyl maleate as graftlinking agent with a final stage polymerized from about 60 to 100 percent by weight methyl methacrylate. A preferred two stage interpolymer of this type is commercially available under the tradename, ACRYLOID® KM 330, from Rohm & Haas Chemical Company.

The final or shell stage monomer system can be comprised of $C_1$ to $C_{16}$ methacrylate, styrene, acrylonitrile, alkyl acrylates, allyl methacrylate, diallyl methacrylate, and the like, as long as the overall $T_g$ system is at least 20° C. Preferably, the final stage monomer system is at least 50 weight percent $C_1$ to $C_4$ alkyl methacrylate. It is further preferred that the final stage polymer be free of units which tend to degrade poly(alkylene terephthalates), for example acid, hydroxyl, amino, and amide groups.

The multiphase composite interpolymers are prepared sequentially by emulsion polymerization techniques wherein each successive outer stage coats the previous stage polymer. By way of illustration, the monomeric $C_1$–$C_6$ acrylate, the cross-linking monomer and the graft-linking monomer are copolymerized in water in the presence of a free-radical generating catalyst and a polymerization regulator which serves as a chain transfer agent, at a temperature on the order of from 15° C. to 80° C. The first elastomeric phase is formed in situ to provide a latex of the core copolymer.

Thereafter, the second rigid thermoplastic phase monomers are added and are emulsion polymerized with the core-copolymer latex to form the interpolymers. A more detailed description of the preparation of the acrylate-based interpolymers for use herein as component (b) are found in U.S. Pat. No. 4,034,013 and 4,096,202, both being specifically incorporated herein by reference.

A second amorphous copolymer resin for use herein as component (b) comprises (ii) a butadiene-based core-shell multiphase composite interpolymer resin. The butadiene-based core shell interpolymers generally comprise a conjugated diene-based core, an intermediate grafted phase of polymerized vinyl monomer units and a final phase or shell comprised of a polymerized monomeric compound selected from the group consisting of a $C_1$–$C_6$ alkyl acrylate, a $C_1$–$C_6$ alkyl methacrylate, acrylic acid, methacrylic acid, and a mixture of any of the foregoing with a crosslinking monomer.

More particularly, the first or core phase of butadiene-based core-shell copolymer component (b) (ii) comprises polymerized conjugated diene units of a copolymer of polymerized diene units with polymerized units of a vinyl aromatic compound or mixtures of said compounds. Suitable conjugated dienes for use in said core phase include butadiene, isoprene, 1,3-pentadiene and the like. Illustrative vinyl aromatic compounds include styrene, alphamethylstryene, vinyl toluene, paramethylstyrene, and the like and esters of acrylic or methacrylic acid. The core of said copolymer should comprise at least about 50 percent of diene units. The preferred grafted core-shell copolymer for use herein includes a core of a styrene-butadiene copolymer comprising about 10 to 50% by weight styrene and about 90 to 50% by weight of butadiene, and having a molecular weight within the range of about 150,000 to 500,000. The core phase may also include a cross-linking monomer, more particularly described hereinafter.

Although it is optional but preferred herein, butadiene-based core-shell copolymer (b) (ii) may include a second intermediate phase of a polymerized vinyl monomer grafted to said core phase. Suitable vinyl monomers for use in the second intermediate phase include, but are not limited to, styrene, vinyl toluene, alpha-methylstyrene, halogenated styrene, naphthalene, or divinyl benzene. The styrene being especially preferred; vinyl cyanide compounds such as acrylonitriles, methacrylonitrile, alpha-halogenated acrylonitriles, being especially preferred. These vinyl monomers can be used either alone or in admixture.

The final or shell phase of butadiene-based core-shell copolymer (b) (ii) comprises polymerized units of a monomeric compound selected from the group consisting of a $C_1$–$C_6$ alkyl acrylate, a $C_1$–$C_6$ alkyl methacrylate, acrylic acid, methacrylic acid, and a mixture of any of the foregoing together with a cross-linking monomer. More particularly, the monomeric compound may be a $C_1$–$C_6$ alkyl acrylate, e.g., methyl acrylate, ethyl acrylate, hexyl acrylate, and the like; a $C_1$–$C_6$ alkyl methacrylate, e.g., methyl methacrylate, ethyl methacrylate, hexyl methacrylate, and the like; acrylic acid or methacrylic acid. Methyl methacrylate is preferred.

In addition to the monomeric compound, the final or shell phase of butadiene-based core shell copolymer (b) (ii) includes a crosslinking monomer in an amount ranging from about 0.1 to about 2.5 parts by weight based upon the weight of the overall copolymer. The crosslinking monomer is a polyethylenically unsaturated monomer having a plurality of addition polymerizable reactive groups, all of which polymerize at substantially the same rate of reaction. Suitable crosslinking monomers include poly acrylic and poly methacrylic acid esters of polyols such as butylene diacrylate and dimethacrylate, trimethylol propane trimethacrylate, and the like, divinyl and trivinyl benzene, vinyl acrylate and methacrylate and the like. The preferred crosslinking monomer is butylene diacrylate.

Butadiene based core-shell interpolymer component (b) (ii) generally comprises from about 60 to 80 parts by weight of said core phase, from about 10 to 20 parts by weight of said intermediate phase and from about 10 to 20 parts by weight of said shell phase. An especially preferred grafted core-shell copolymer for use as component (b) (ii) herein is a core-shell polymer having a core representing 77.5 parts by weight polymerized from 71 parts butadiene and 3 parts styrene, 4 parts methymethacrylate and 1 part divinyl benzene; a second phase polymerized from 11 parts by weight styrene, and a shell polymerized from 11 parts by weight methyl methacrylate and 0.1 parts by weight of 1,3-butylene glycol dimethyacrylate. A commercially available grafted core-shell polymer for use herein as component (b) (ii) is ACRYLOID® KM 653 from Rohm and Haas Chemical Company, The butadiene-based core-shell interpolymers are also prepared sequentially by emulsion polymerization techniques wherein each successive outer stage coats the previous stage polymer. The butadiene-based core-shell interpolymers and the methods for their preparation are more fully described in U.S. Pat. No. 4,180,494, which is specifically incorporated herein by reference.

It should be understood that the foregoing acrylate-based core-shell interpolymers and the butadiene-based core-shell interpolymers are finely divided particles prepared by emulsion polymerization which are difficult to handle. These polymer rubber dusts are extremely flammable and the potential for dust explosions during the handling of these materials is a significant risk. More importantly, use of these powders may present a health hazard to workers exposed to work environments which contains higher levels of polymer dusts. Moreover, the dispersion of these powders into polymer matrices during normal processing is generally poor.

Therefore, in accordance with a preferred embodiment of the present invention, wherein relatively higher quantities of the acrylate-based or butadiene-based core-shell interpolymers are required for low modulus attainment than were heretofore disclosed for impact modification, the core-shell copolymer selected is desirably first precompounded with a second polymer resin or organic compound to form a concentrate.

In accordance with this preferred embodiment the acrylate-based core-shell interpolymers or the butadiene-based core-shell interpolymers are precompounded with the second component under relatively mild conditions of low temperature and low shear. Suitable for use as the second component in these preferred precompounded concentrate compositions are, all or a portion of the poly(alkylene terephthalate) resin described above with reference to component (a): an olefinic resin selected from olefinic homopolymers and copolymers; or a triaryl phosphate composition, to be more fully described below with reference to enhancing agent, component (c).

The olefin resins for use in forming the precompounded concentrates of the core-shell interpolymer resins are selected from olefinic homopolymers and copolymers. The olefin homopolymers are well known and commercially available and may be selected from polyethylene, polypropylene, polyisobutylene and the like and also may be present in the form of mixtures of these homopolymers. The preferred olefin homopolymer for use herein is polyethylene.

Especially preferred in this context are olefinic copolymers comprising copolymers of an olefin and at least one monomeric compound selected from the group consisting of a $C_1$–$C_6$ alkyl acrylate, a $C_1$–$C_6$ alkyl methacrylate, acrylic acid, methacrylic acid and a mixture of any of the foregoing monomers.

The olefin copolymer is made from an olefin, e.g., ethylene, propylene, or the like, copolymerized with one or more of a comonomer comprising a $C_1$–$C_6$ alkyl acrylate, e.g., methyl acrylate, ethyl acrylate, hexyl acrylate and the like; a $C_1$–$C_6$ alkyl methacrylate, e.g., methyl methacrylate, ethyl methacrylate, hexyl methacrylate, and the like; acylic acid; or methacrylic acid. Especially preferred are the well known copolymers of ethylene with an alkyl ester of acrylic acid. These are disclosed in U.S. Pat. No. 2,953,551. Generally, the acrylate or methacrylate portion of the copolymer can range from about 10 to about 30 weight percent. The olefin portion of the copolymer can range from about 70 to about 90 weight percent. The preferred olefin copolymer for use herein in the preferred concentrate is an ethylene-ethyl acrylate copolymer in which the weight ratio of the ethylene fraction to the ethyl acrylate fraction is about 4.5 to 1. Suitable olefin-acrylate copolymers, as defined above, can be prepared by methods well known to those skilled in the art or can be obtained commercially. For example, Union Carbide's BAKELITE® DPD-6169 ethylene-ethyl acrylate copolymer is suitable for use in the present embodiment of this invention.

More particularly, precompounding may be preformed by melt-blending the core-shell interpolymer selected and the second component e.g. the polyester resin, the olefin homopolymer or copolymer resin or the triarylphosphate composition in equipment such as compounding extruder, rubber mill, banbury mixer and the like, followed by dicing or pelletizing of the pre-blended components. The precompounded concentrates of the core-shell interpolymer resins may be thereafter be admixed with the polyester resin, and if desired polycarbonate resin, and other additives to form the new and improved low modulus compositions of this invention. The precompounded concentrate is easily melt-blended into the polyester resulting in a more complete and uniform dispersion of the core-shell interpolymer resin throughout the polymer matrix. The precompounded concentrates are easier to handle and eliminate or substantially reduce the danger of chemical dust explosions and worker exposure to chemical dust.

A third amorphous copolymer resin for use herein as component (b) comprises (iii) a terpolymer derived from a monomer system comprising a $C_1$–$C_6$ alkyl acrylate, a $C_1$–$C_6$ alkyl methacrylate and a monoalkenyl aromatic compound. These terpolymers are prepared by copolymerizing a $C_1$–$C_6$ alkyl acrylate, e.g., methyl acrylate, ethyl acrylate, butyl acrylate, hexyl acrylate, and the like and preferably n-butyl acrylate with comonomers selected from $C_1$–$C_6$ alkyl methacrylates, e.g., methyl methacrylate, ethyl methacrylate, hexyl methacrylate and the like, preferably methyl methacrylate, and monoalkenyl aromatic compounds, such as styrene, alpha-methyl styrene, vinyl toluene, vinyl xylene, vinyl naphthalene, and the like, although styrene is preferred. A preferred terpolymer comprises butyl acrylate-methyl methacrylate-styrene. A commercially available terpolymer of this preferred type is sold under the tradename, DURASTRENGTH® 200, from Metal & Thermit Co.

These alkyl arylate-alkylmethacrylate-mono-alkenyl aromatic terpolymers may be prepared by emulsion polymerization.

In accordance with the present invention the substantially crystalline linear thermoplastic polyester resin copolymer (a) and the substantially amorphous copolymer (b), which in the case of the core-shell interpolymers may be added in precompounded concentrate form, are admixed, together with any other ingredients, to form the final composition.

This can be done in any convenient manner, such as, for example, by dry blending the ingredients, followed by extrusion at temperatures of about 450° to 550° F., cooling the extrudate and chopping to form pellets. The pellets may thereafter by re-extruded or injection molded to form flexible shaped articles.

The thermoplastic polyester compositions of the present invention will generally comprise, without limitation, from about 15 to about 55 parts by weight of substantially crystalline polyester resin component (a), and from about 35 to about 85 parts by weight of substantially amorphous copolymer component (b), based upon the total weight of (a) and (b) combined. The exact relative proportions of (a) to (b) may vary depending on the polyester resin composition selected for component (b), it being only critical that the flexural modulus of the composition defined by components (a) and (b) be not substantially greater than about 120,000 psi, and especially preferably, not greater than about 100,000 psi.

It has further been discovered, that if an enhancing agent, component (c), is added to the low modulus, flexible thermoplastic polyester compositions defined by (a) and (b) above, the flexural modulus of the overall composition may be advantageously and effectively reduced to not substantially greater than about 70,000 psi. This permits the incorporation of other additives such as mineral fillers, glass reinforcements, flame retardant agents and the like, and further provides a low modulus thermoplastic polyester composition having a flexural modulus of not substantially greater than about 140,000 psi.

More particularly, in accordance with a second aspect of the present invention, new and improved ultra-low modulus thermoplastic polyester compositions are provided in the form of compositions comprising:
(a) a substantially crystalline thermoplastic linear polyester resin composition;
(b) an amount of a component capable of reducing the flexural modulus of (a) to not substantially greater than about 140,000 psi, said component comprising at least one substantially amorphous copolymer resin; and
(c) a minor effective amount of an enhancing agent; said enhancing agent being capable of further reducing the flexural modulus of (a) and (b) to not substantially greater than about 70,000 psi, said enhancing agent being selected from the group consisting of triaryl phosphates, ortho and para-toluenesulfonamides, and N-alkyl-substituted toluene-sulfonamides.

The triaryl phosphate compounds suitable for use as enhancing agent (c) herein, are the triaryl phosphates represented by the formula:

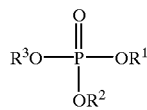

wherein $R^1$, $R^2$ and, $R^3$ are each independently aryl, alkyl substituted aryl, hydroxyaryl, hydroxyalkaryl, and halogen substituted aryl.

Examples include cresyl diphenyl phosphate, tricresyl phosphate, phenyl dicresyl phosphate, triphenyl phosphate and tri-(polychlorophenyl) phosphate, to name but a few. Of those mentioned, triphenyl phosphate is preferred. In addition, mixtures of two or more of the triaryl phosphates may be employed as component (c). The triaryl phosphates are well known materials which may be prepared in accordance with conventional methods. A triaryl phosphate composition suitable for use herein as enhancing agent (c) is commercially available under the trade designation, KRONITEX® 100, from FMC Company. As has been mentioned above, the triaryl phosphate enhancing agent may be precompounded with either the acrylate-based or butadiene based core-shell interpolymers to form a concentrate, prior to further blending with the polyester resin (a) and any other additional ingredients.

The ortho- and para-toluene sulfonamides and N-alkyl substituted toluenesulfonamides are also well known materials which may be prepared in accordance with conventional methods. Suitable o,p-toluenesulfonamides are commercially available under the trade designation, SANTICIZER® 9, and N-alkyl toluenesulfonamides under the trade designation, MXP-2097, both from Monsanto Company.

In accordance with this aspect of the present invention enhancing agent (c) is added to the low modulus composition defined by components (a) and (b) to form an ultra low modulus thermoplastic polyester composition which exhibits a flexural modulus of not substantially greater than 70,000 psi. Typically, enhancing agent (c) needs to be added only in minor effective amounts. Broadly, component (c) may be added in amounts of from about 5 to about 25 parts, based upon the weight of components (a), (b) and (c) combined, to produce the ultra-low modulus compositions defined above.

In accordance with this aspect of the invention, it has unexpectedly been discovered that additives such as mineral fillers, glass fiber reinforcements, and flame retardant agents may be added to the ultra low modulus compositions defined by components (a), (b) and (c), in their conventionally employed amounts, and flexible thermoplastic polyester compositions having a flexural modulus of not substantially greater than about 140,000 psi may still be obtained.

Therefore, in accordance with this preferred aspect of the invention, the new and improved ultra low modulus compositions of the subject invention defined by components (a), (b) and (c), may additionally comprise fillers, especially reinforcing fillers such as fibrous (filamentous) glass or mineral fillers, such as clay, mica, talc, and the like, preferably clay. The fillers can be untreated or treated with silane or titanate coupling agents, etc. The filamentous glass to be employed as reinforcement in such embodiments of the present compositions is well known to those skilled in the art and is widely available from a number of manufacturers. For compositions ultimately to be employed for electrical uses, it is preferred to use fibrous glass filaments comprised of lime-aluminum borosilicate glass that is relatively soda free. This is known as "E" glass. However, other glasses are useful where electrical properties are not so important, e.g., the low soda glass known as "C" glass. The filaments are made by standard processes, e.g., by steam or air blowing, flame blowing and mechanical pulling. The preferred filaments for plastic reinforcement are made by mechanical pulling. The filament diameters range from about 0.00012 to 0.00075 inch, but this is not critical to the present invention.

The length of the glass filaments and whether or not they are bundled into fibers and the fibers bundled in turn to yarns, ropes or rovings, and the like, are also not critical to the invention, However, in preparing the molding compositions, it is convenient to use the filamentous glass in the form of chopped strands of from about one-eighth to about 2 inches long. In articles molded from the compositions, on the other hand, even shorter lengths will be encountered because, during compounding, considerable fragmentation will occur. This is desirable, however, because the best properties are exhibited by thermoplastic injection molded articles in which the filament lengths lie between about 0.005 to 0.250 inch.

The amount of the filler can vary widely depending on the formulation and needs of the particular composition. Preferably, however, the reinforcing filler will comprise from about 1 to about 60% by weight of filler (d), and especially preferably from about 5 to about 40% by weight, based upon the weight of components (a), (b) and (c) combined.

The ultra low modulus thermoplastic polyester compositions of the present invention, alone, or in combination with a filler or fillers, can be rendered flame retardant with an effective amount of a conventional flame retardant agent (e). As is well known, flame retardants can be based on elementary red phosphorus, phosphorus compounds, halogen and nitrogen compounds alone, or preferably in further combination with synergists, such as antimony compounds. Especially useful are polymeric and oligomeric flame retardant agents comprising tetrabromobisphenol-A carbonate units, see, for example, Wambach, U.S. Pat. No. 3,833,685, which is incorporated herein by reference.

Other ingredients such as dyes, pigments, drip retardants and the like can be added in conventional amounts for their conventionally employed purposes.

As explained previously, the new and improved flexible thermoplastic polyester compositions may be prepared by conventional compounding-extrusion techniques in existing equipment.

Components (a), (b) and, optionally (c), (d) and (e), may be compounded by dry blending. Thereafter the blend may be extruded at a temperature between 450 to 550° F. The extrudate may then be cooled and comminuted to form injection moldable or extrudable pellets. If desired, the pellets may be injection molded at a temperature of about 450° to 550° F. (50 to 250° F. mold temperature) to form shaped articles.

The new and improved flexible thermoplastic polyester compositions of the present invention exhibit reduced flexural moduli of less than about 140,000 psi and very satisfactory flexibility after extrusion and molding. The new and improved compositions are well suited for forming flexible shaped articles such as hoses, tubings, wire coatings, cable jacketing and the like.

In order that those skilled in the art may better understand how the present invention may be practiced, the following examples are given by way of illustration and not by way of limitation.

DESCRIPTION OF THE PREFERRED EMBODIMENTS

In the following examples, all parts and percentages are by weight unless otherwise specified. The various polyester compositions were first dry blended, then compounded and extruded in a Prodex extruder at 500° F. and finally, molded in a Van Dorn injection molding machine at 450° F. (100° F. mold temperature) to from test specimens. The test specimens were molded to form ASTM test bars 2½"×½"×⅛" dimensions. The physical properties of the various compositions were determined in accordance with ASTM procedures on the test specimens.

EXAMPLE 1

The following compositions were prepared by dry blending the ingredients, followed by compounding and extrusion to form pellets. The pellets were injection molded to form standard test specimens. The compositions prepared and the results obtained are set forth in TABLE 1 as follows:

TABLE 1

FLEXIBLE THERMOPLASTIC POLYESTER COMPOSITIONS OF A POLYESTER RESIN COMPOSITION AND AN ACRYLATE-METHACRYLATE CORE-SHELL AMORPHOUS COPOLYMER RESIN

| | EXAMPLES | | | | | |
|---|---|---|---|---|---|---|
| | A* | B* | C* | D** | E*** | 1 |
| COMPOSITIONS (pbw) | | | | | | |
| Poly(1,4-butylene terephthalate)[a.] | 99.8 | 60 | 84.95 | 59.8 | 56.1 | 20.0 |
| Poly(ethylene terephthalate)[b.] | — | 40 | — | — | — | — |
| Poly(bisphenol-A carbonate)[c.] | — | — | 15.0 | — | 18.7 | — |
| Acrylate-methacrylate core-shell copolymer resin[d.] | — | — | — | 40.0 | 25.0 | 80 |
| Stabilizer/mold release | 0.2 | — | 0.05 | 0.2 | 0.2 | — |
| PROPERTIES: | | | | | | |
| ⅛" notched Izod impact strength, ft-lbs/in. | 1.0 | 0.50 | 1.0 | NB | 17.8 | 5.1 |
| ⅛" unnotched Izod impact strength, ft.-lbs./in. | — | — | — | NB | — | NB |
| Flexural strength, psi | — | 12,870 | — | 5,354 | — | 1,300 |
| Flexural modulus, psi | 340,000 | 394,000 | 350,000 | 156,200 | 250,000 | 40,000 |
| Tensile strength, psi | 7,500 | 7,460 | 9,400 | 3,480 | 5,800 | 900 |
| Tensile elongation, % | | 4.3 | | 140 | | 33 |

[a.]VALOX ® 295, General Electric Company.
[b.]VITUF ® 738A7C, Goodyear Tire and Rubber Company.
[c.]LEXAN ® 121, General Electric Company.
[d.]ACRYLOID ® KM330, Rohm & Haas Chemical Company.
*Control.
**within the scope of Farnham et al, U.S. Pat. No. 4,06,202.
***within the scope of Cohen et al, U.S. Pat. No. 4,257,937.

The above example illustrates a new and improved flexible thermoplastic polyester composition of the subject invention exhibiting flexural moduli of less than about 140,000 psi, preferably less than about 120,000 psi and especially preferably less than about 100,000 psi obtained in accordance with the teachings herein. A comparison of the results of the compositions of Examples D and 1 clearly shows that following the teachings of the impact modified prior art compositions disclosed by Farnham et al do not lead the skilled artisan to the low modulus flexible polyester compositions described herein and shown by Example 1.

EXAMPLES 2–15

The following examples demonstrate the use of a precompounded concentrate of the acrylate-methacrylate core-shell interpolymer resin in providing flexible thermoplastic compositions in accordance with the present invention.

The precompounded concentrate compositions were prepared by tumbling the acrylate-methacrylate core-shell interpolymer resin with the second components in the relative proportions shown to form a dry blend. The dry blend was transferred to a prodex extruder and compounded and extruded at 450° F. to form pellets.

The resulting precompounded concentrates were then blended and extruded with the remaining components and injection molded to form test specimens in accordance with the procedures of Example 1.

The compositions prepared and the results obtained are set forth in TABLE 2 as follows:

TABLE 2

FLEXIBLE THERMOPLASTIC POLYESTER COMPOSITIONS CONTAINING VARIOUS PRE-COMPOUNDED ACRYLATE-METHACRYLATE CORE-SHELL INTERPOLYMER RESIN CONCENTRATES

| | EXAMPLES | | | | | | |
|---|---|---|---|---|---|---|---|
| | 1 | 2 | 3 | 4 | 5 | 6 | 7 |
| COMPOSITIONS (pbw) | | | | | | | |
| Poly(1,4-butylene terephthalate)[a] | 19.8 | 10.0* | 19.8* | — | — | — | — |
| Poly(ethylene terephthalate)[b] | — | — | — | 10.0 | — | — | — |
| Poly(bisphenol-A carbonate)[c] | — | — | — | — | 10.0** | 14.8 | — |
| Acrylate-methacrylate core-shell interpolymer resin[d] | 80.0 | — | — | — | — | — | 10.0 |
| KM330/PBT concentrate[e] | — | 89.8 | 80.0 | 89.8 | 89.8 | 85.0 | 89.8 |
| KM330/EEA concentrate[f] | — | — | — | — | — | — | — |
| KM330/triaryl phosphate concentrate[g] | — | — | — | — | — | — | — |
| Mold release/stabilizers | 0.2 | 0.2 | 0.2 | 0.2 | 0.2 | 0.2 | 0.2 |
| PROPERTIES: | | | | | | | |
| ⅛" notched Izod impact strength ft./lbs./in. | 5.1 | 11 | NB | NB | 10 | 11.0 | 9.9 |
| ⅛" unnotched Izod impact strength ft./lbs./in. | NB | NB | NB | NB | NB | NB | NB |
| flexural strength, psi. | 1,300 | 2,800 | 3,900 | 2,750 | 2,900 | 4,100 | 2,200 |
| flexural modulus, psi | 40,000 | 83,200 | 113,000 | 84,700 | 92,900 | 108,000 | 67,000 |
| tensile strength, psi | 900 | 2,800 | 3,100 | 1,900 | 2,500 | 3,400 | 2,400 |
| tensile elongation, % | 33 | 116 | 145 | 170 | 93 | 110 | 141.6 |

| | EXAMPLES | | | | | | | |
|---|---|---|---|---|---|---|---|---|
| | 8 | 9 | 10 | 11 | 12 | 13 | 14 | 15 |
| COMPOSITIONS (pbw) | | | | | | | | |
| Poly(1,4-butylene terephthalate)[a] | 18.3 | 38.3 | 58.3 | 44.8 | 34.8 | 29.8 | 29.8 | 49.9 |
| Poly(ethylene terephthalate)[b] | — | — | — | — | — | — | — | — |
| Poly(bisphenol-A carbonate)[c] | — | — | — | 15.0** | 20 | 25.0 | 25.0** | — |
| Acrylate-methacrylate core-shell interpolymer resin[d] | — | — | — | — | — | — | — | — |
| KM330/PBT concentrate[e] | — | — | — | 40.0 | 45.0 | 45.0 | 45.0 | — |
| KM330/EEA concentrate[f] | 80.0 | 60.0 | 40.0 | — | — | — | — | — |
| KM330/triaryl phosphate concentrate[g] | — | — | — | — | — | — | — | 49.9 |
| Mold release/stabilizers | 1.7 | 1.7 | 1.7 | 0.2 | 0.2 | 0.2 | 0.2 | 0.2 |
| PROPERTIES: | | | | | | | | |
| ⅛" notched Izod impact strength ft./lbs./in. | 6.4 | 7.3 | 1.7 | 11.5 | 10.8 | 11.4 | 12.3 | 1.2 |
| ⅛" unnotched Izod impact strength ft./lbs./in. | NB | NB | NB | — | — | — | — | NB |
| flexural strength, psi. | 1,300 | 2,700 | 5,200 | 6,100 | 5,200 | 5,800 | 5,600 | 1,500 |
| flexural modulus, psi. | 40,000 | 72,000 | 137,000 | 139,000 | 120,000 | 139,000 | 134,000 | 44,400 |
| tensile strength, psi | 1,300 | 2,300 | 3,500 | 3,900 | 3,400 | 3,800 | 3,500 | 2,000 |
| tensile elongation, % | 43 | 80 | 102 | 140 | 115 | 106 | 108 | — |

[a] VALOX ® 295, General Electric Company.
[b] VITUF ® 7376C, Goodyear Tire and Rubber Company.

TABLE 2-continued

FLEXIBLE THERMOPLASTIC POLYESTER COMPOSITIONS CONTAINING VARIOUS PRE-COMPOUNDED ACRYLATE-METHACRYLATE CORE-SHELL INTERPOLYMER RESIN CONCENTRATES

[c.] LEXAN ® 121, General Electric Company.
[d.] ACRYLOID ® KM330, Rohm & Haas Chemical Company
[e.] 70:30, w:w ACRYLOID KM330:VALOX ® 315, General Electric C0.
[f.] 2:1, w:w ACRYLOID KM330:BAKELITE ® DPD6169 (Union Carbide Co.).
[g.] 50:50, w:w, ACRYLOID KM330:KRONITEX ® 100 (FMC Company)
*VALOX ® 315, General Electric Company.
**LEXAN ® 131, General Electric Company The data obtained clearly demonstrate that new and improved flexible thermoplastic polyester compositions having a flexural modulus of not substantially greater than 140,000 psi may be obtained by utilizing precompounded concentrates of an acrylate-methacrylate core-shell interpolymer resin in the amounts shown. Moreover, the use of a precompounded concentrate permits handling and processing of the acrylate-methacrylate core-shell interpolymer resins to be performed more easily and under relatively safer conditions, than with unprecompounded powders.

EXAMPLES 16–18

The following examples illustrate the new and improved low modulus thermoplastic polyester compositions of the subject invention wherein the amorphous copolymer component (b) is a butadiene-based core-shell multiphase composite interpolymer resin.

The following compositions were prepared, molded and tested in accordance with the procedures of Example 1.

The compositions prepared and the results obtained are set forth in TABLE 3 as follows:

TABLE 3

FLEXIBLE THERMOPLASTIC COMPOSITIONS OF A POLYESTER RESIN COMPOSITION AND A BUTADIENE-BASED CORE-SHELL AMORPHOUS COPOLYMER RESIN

|  | EXAMPLES | | |
|---|---|---|---|
|  | 16 | 17 | 18 |
| COMPOSITIONS (pbw) | | | |
| Poly(1,4-butylene terephthalate)[a.] | 55.0 | 35.0 | 20 |
| Poly(ethylene terephthalate)[b.] | — | — | — |
| Poly(bisphenol-A carbonate)[c.] | — | — | 15.0 |
| MMBS grafted core-shell interpolymer[d.] | 40.0 | 60.0 | 60.0 |
| Mold release/stabilizers | 5.0 | 5.0 | 5.0 |
| PROPERTIES: | | | |
| ⅛" notched Izod impact strength, ft.-lbs/in. | NB | NB | NB |
| ⅛" unnotched Izod impact strength, ft.-lbs/in. | NB | NB | NB |
| Flexural strength, psi | 4,300 | 2,500 | 3,300 |
| Flexural modulus, psi | 129,000 | 76,000 | 94,000 |
| Tensile strength, psi | 3,100 | 1,800 | 2,500 |
| Tensile elongation, % | 149 | 108 | 138 |

[a.] VALOX ® 315, General Electric Company.
[b.] VITUF ® VF 738A7C, Goodyear Tire & Rubber Company.
[c.] LEXAN ® 131, General Electric Company
[d.] ACRYLOID ® KM653, Rohm & Haas Chemical Company.

These data illustrate that new and improved thermoplastic polyester compositions having a flexural modulus of not substantially greater than about 140,000 psi are obtained in accordance with the teachings of the present invention wherein the amorphous copolymer resin is a butadiene-based core-shell multiphase composite interpolymer resin.

EXAMPLES 19–21

The following examples illustrate the new and improved low modulus thermoplastic polyester compositions of the subject invention wherein the amorphous copolymer resin component (b) is an alkyl-acrylate-alkyl methacrylate-monoalkenyl aromatic terpolymer.

The following compositions were prepared, molded and tested in accordance with the procedures of Example 1.

The compositions prepared and the results obtained are set forth in TABLE 4 as follows:

TABLE 4

FLEXIBLE THERMOPLASTIC COMPOSITIONS OF A POLYESTER RESIN COMPOSITION AND AN ACRYLATE-METHACRYLATE-ALKENYL AROMATIC TERPOLYMER

|  | EXAMPLES | | |
|---|---|---|---|
|  | 19 | 20 | 21 |
| COMPOSITIONS (pbw) | | | |
| Poly(1,4-butylene terephthalate)[a.] | 38.3 | 28.3 | 23.3 |
| Poly(ethylene terephthalate)[b.] | — | 10 | — |
| Poly(bisphenol-A carbonate)[c.] | — | — | 15.0 |
| n-butylacrylate-methyl methacrylate-styrene terpolymer[d.] | 60 | 60 | 60.0 |
| Mold release/stabilizers | 1.7 | 1.7 | 1.7 |
| PROPERTIES: | | | |
| ⅛" notched Izod impact strength, ft.-lbs/in. | 2.4 | 2.4 | 8.0 |
| ⅛" unnotched Izod impact strength, ft.-lbs/in. | NB | NB | NB |
| Flexural strength, psi | 2,470 | 2,750 | 4,389 |
| Flexural modulus, psi | 81,000 | 86,000 | 130,000 |
| Tensile strength, psi | 2,500 | 2,475 | 3,584 |
| Tensile elongation, % | 52 | 39 | 51 |

[a.] VALOX ® 315, General Electric Company.
[b.] VITUF ® VF 738A7C, Goodyear Tire & Rubber Company.
[c.] LEXAN ® 131, General Electric Company
[d.] DURASTRENGTH ® 200, Metal & Thermit Company.

New and improved flexible thermoplastic polyester compositions having a flexural modulus of less than about 140,000 psi were obtained with an amorphous copolymer resin comprising an alkyl acrylate-alkyl methacrylate-monoalkenyl aromatic terpolymer.

EXAMPLES 22–27

The following examples illustrate the ultra-low modulus flexible thermoplastic polyester compositions of the subject invention and demonstrate the surprising and unexpected results obtained when the compositions contain fillers, reinforcements and flame retardant agents.

The following compositions were prepared, molded and tested in accordance with the methods of Example 1.

The compositions prepared and the results obtained are set forth in TABLE 5:

TABLE 5

ULTRA LOW MODULUS THERMOPLASTIC COMPOSITIONS OF A POLYESTER RESIN COMPOSITION, AMORPHOUS COPOLYMER RESIN, AND MODULUS REDUCING ENHANCING AGENT

| | EXAMPLES | | | | | |
|---|---|---|---|---|---|---|
| | 22 | 23 | 24 | 25 | 26 | 27 |
| COMPOSITIONS (pbw) | | | | | | |
| Poly(1,4-butylene terephthalate)[a] | — | — | — | 10.0 | — | — |
| Poly(ethylene terephthalate)[b] | — | — | — | — | — | — |
| Poly(bisphenol-A carbonate)[c] | — | — | — | — | — | — |
| KM330/PBT concentrate[d] | 89.8 | 89.8 | 89.8 | 79.8 | 79.8 | 60.8 |
| N-alkyl toluene sulfonamide[e] | 10.0 | — | — | — | — | — |
| Triphenyl phosphate[f] | — | 10.0 | — | 10 | 10 | 10 |
| o,p-toluene sulfonamide[g] | — | — | 10.0 | — | — | — |
| KM330/triarylphosphate concentrate[h] | — | — | — | — | — | — |
| Copolycarbonate flame retardant[i] | — | — | — | — | — | 20 |
| Antimony oxide concentrate[j] | — | — | — | — | — | 8.5 |
| Drip retardant[k] | — | — | — | — | — | 0.5 |
| Glass Fibers | — | — | — | — | — | — |
| Clay | — | — | — | — | 10 | — |
| Mold release/stabilizers | 0.2 | 0.2 | 0.2 | 0.2 | 0.2 | 0.2 |
| PROPERTIES | | | | | | |
| ⅛" notched Izod impact strength, ft.-lbs/in. | 7.85 | NB | NB | NB | NB | 2.08 |
| ⅛" unnotched Izod impact strength, ft. lbs/in. | NB | NB | NB | NB | NB | NB |
| Flexural strength, psi | 1,560 | 1,577 | 1,311 | 2,850 | 1,350 | 2,170 |
| Flexural modulus, psi | 51,300 | 55,200 | 37,400 | 91,900 | 58,650 | 87,200 |
| Tensile strength, psi | 1,600 | 1,100 | 1,700 | 3,100 | 1,024 | 1,400 |
| Tensile elongation, % | 89 | 60 | 171 | 157 | 131% | 108 |
| FLammability UL-94 | — | — | — | — | — | V-O |

[a] VALOX ® 315, General Electric Company
[b] VITUF ® 738A7C, Goodyear Tire & Rubber Company.
[c] LEXAN ® 131, General Electric Company.
[d] 70:30 ACRYLOID ® KM330:VALOX ® 315.
[e] MPX-2097, Monsanto Company.
[f] Monsanto Company.
[g] SANTICIZER ® 9, Monsanto Company
[h] 50:50 KM330:KRONITEX ® 100 FMC Company.
[i] 50:50 w:w Tetrabromobisphenol-A:Bisphenol-A copolycarbonate
[j] 90:10 w:w Sb$_2$O$_3$:polyethylene
[k] 90:10 w:w polytetrafluoroethylene:polyethylene.

These data illustrate the ultra-low modulus thermoplastic polyester compositions obtained by incorporating enhancing agents (c) in addition to the amorphous copolymer resins (b) in the polyester resin compositions in accordance with the teachings of the present invention. The data of Examples 26 and 27 unexpectedly demonstrate that these ultra-low modulus compositions may be modified by the addition of fillers reinforcements and flame retardant agents, without a concurrent and significant sacrifice in flexibility, which would be expected from the teachings of the prior art. More particularly, the data show that the incorporation of these additives into the ultra-low modulus compositions may be accomplished, and substantially flexible thermoplastic polyester compositions still be obtained having flexural moduli of not substantially greater than 140,000 psi, and as is preferred not substantially greater than 120,000 psi, and as is especially preferred, not substantially greater than 100,000 psi.

The new and improved flexible thermoplastic compositions of the subject invention may be prepared and thermoformed into useful flexible shaped articles such as hoses, tubings, wire coatings, cable jackets and the like, by conventional compounding and extrusion methods and injection molding methods.

Although the present invention has been described with reference to certain preferred embodiments, modifications or changes may be made therein by those skilled in the art. For example, instead of an n-butyl acrylate/methacrylate core-shell interpolymer being used as the acrylate-based core-shell amorphous copolymer, component (b) (i), one having a core comprising ethyl acrylate or hexyl acrylate may be used. In butadiene-based core-shell interpolymer component (b) (ii), substitution can be made in whole or in part of isoprene or 1,3-pentadiene for the butadiene in the core. All such modifications or changes, as well as others, may be made by those skilled in the art without departing from the scope and spirit of the present invention, as defined by the appended claims.

What is claimed is:

1. An improved low modulus, flexible thermoplastic molding and extrusion composition having a flexural modulus of about 140,000 or below as determined in accordance with ASTM D790, comprising in physical admixture (a) about 20 percent by weight of a polyalkylene terephthalate resin;

(b) about 15 percent by weight of an aromatic polycarbonate resin;

(c) about 60 percent by weight of a substantially amorphous copolymer resin comprising a butadiene based core-shell multiphase composite interpolymer resin; and (d) at least one triarylphosphate.

2. A flexible thermoplastic composition as recited in claim 1, wherein the overall composition has a flexural modulus of not substantially greater than about 120,000 psi.

3. A flexible thermoplastic composition as recited in claim 1, wherein the overall composition has a flexural modulus of not substantially greater than about 100,000 psi.

4. A flexible thermoplastic composition as recited in claim 1, wherein said aromatic polycarbonate resin comprises recurring structural units of the formula:

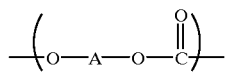

wherein A is a divalent aromatic radical of a dihydric phenol.

5. A flexible thermoplastic composition as recited in claim 1, wherein in said formula, A is derived from a 4,4'-dihydroxy-di(mononuclear aryl) alkane.

6. A flexible thermoplastic composition as recited in claim 5, wherein said aromatic polycarbonate resin comprises poly(2,2-dihydroxyphenylpropane) carbonate.

7. A flexible thermoplastic composition as recited in claim 1, wherein said butadiene-based core-shell multiphase composite interpolymer resin comprises a core phase comprising a butadiene-styrene copolymer, an intermediate phase comprising polymerized styrene and a shell phase comprising methyl methacrylate and 1,3-butylene glycol dimethyacrylate as a cross-linker.

8. A flexible thermoplastic composition as recited in claim 7, wherein said butadiene-based core-shell multiphase composite interpolymer comprises a core phase polymerized from 71 parts by weight butadiene, 3 parts by weight styrene, 4 parts by weight methyl methacrylate and 1 part by weight divinyl benzene; a second intermediate phase polymerized from 11 parts by weight styrene; and a shell phase polymerized from 11 parts by weight methyl methacrylate and 0.1 parts by weight 1,3-butylene glycol dimethyacrylate, based upon the total weight of the butadiene-based core-shell interpolymer.

9. An improved low-modulus, flexible thermoplastic molding and extrusion composition having a flexural modulus of about 140,000 or below as determined in accordance with ASTM D790, comprising;

(a) about 20% by weight of a polyalkylene terephthalate resin;

(b) about 15% by weight of an aromatic polycarbonate resin;

(c) about 60% by weight of a substantially amorphous copolymer resin comprising a butadiene based core-shelled multiphased composite interpolymer resin;

(d) about 5% by weight of a mold release agent or a stabilizer.

10. An improved low-modulus flexible thermoplastic molding and extrusion composition comprising;

(a) about 21 to 44.9% by weight of a polyalkylene terephthalate resin and about 15 to 25% by weight of an aromatic polycarbonate resin;

(b) the balance to make 100% based upon the weight of (a) and (b) of a component capable of reducing the flexural modulus by ASTM D790 of (a) to not substantially greater than about 140,000 psi, said component comprising a butadiene based core-shell multiphase composite interpolymer resin.

11. An improved low modulus, flexible thermoplastic molding and extrusion composition as defined in claim 10, further comprising:

(a) a minor effective amount of an enhancing agent capable of further reducing the flexural modulus of (a) plus (b) to an ultra-low level of not substantially greater than 70,000 psi, said enhancing agent comprising a triarylphosphate.

12. An ultra-low modulus thermoplastic composition as recited in claim 11 further comprising (d)

a flame retardant agent alone or in combination with a synergist compound.

* * * * *